Patented Oct. 11, 1932

1,882,035

UNITED STATES PATENT OFFICE

DONALD H. POWERS, OF PENNS GROVE, NEW JERSEY, ASSIGNOR TO E. I. DU PONT DE NEMOURS & COMPANY, OF WILMINGTON, DELAWARE, A CORPORATION OF DELAWARE

RUBBER PRODUCT AND PROCESS OF PREPARING SAME

No Drawing. Application filed August 31, 1926. Serial No. 132,896.

This invention relates to an improved process for treating rubber and similar materials and to the products obtained thereby. More particularly it relates to the art of vulcanizing rubber and to a new class of compounds especially adapted to accelerate the vulcanization.

The invention has among its principal objects the provision of a process whereby the time and temperature required for satisfactory vulcanization can be lessened and the attainment of a rubber product which is of superior quality and durability.

This application is in the nature of a continuation, in part, of my application Serial No. 34,732, filed June 3, 1925, (now Patent 1,732,532 dated October 22, 1929) which covers products resulting from the interaction of an aldehyde, a primary amine, and carbon disulphide and the employment of these products as vulcanization accelerators.

I have now discovered that those aldehydes containing a plurality of carbon atoms are particularly valuable for the manufacture of products of the accelerator type. Also, I have discovered that, if certain ratios of the three components, which ratios were not specifically disclosed in the previous application, are employed, products of very unusual activity as accelerating agents result. Particularly, I have discovered that the use of two, three or four moles of an aldehyde with one mole of amine gives compounds of remarkable activity. The amines and aldehydes used may be either aliphatic or aromatic, although in the preferred embodiments of my invention I employ aliphatic aldehydes. The compounds resulting are of indefinite composition.

The method of manufacturing these new accelerators may be varied. One method of preparing them is to condense the aldehyde with the amine to form a condensation product, with the elimination of water, and to then treat this product with carbon disulfide.

By equation, the reaction might be expressed as follows:

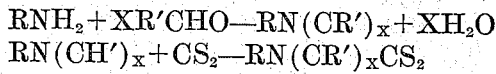

$$RNH_2 + XR'CHO \rightarrow RN(CR')_x + XH_2O$$
$$RN(CH')_x + CS_2 \rightarrow RN(CR')_xCS_2$$

It has also been found that by mixing the amine, $CS_2$ and aldehyde that a product of similar accelerating activity is obtained.

The preparation of the new accelerators may be best disclosed by the presentation of a number of examples embodying the invention. It is to be understood that these examples are purely illustrative and that the conditions, reagents and proportions therein specified are susceptible of variation. The examples follow:

*Example 1.*—310 lbs. butyraldehyde are slowly added in a closed system to 100 lbs. of aniline in a kettle equipped with a jacket, a coil for heating and cooling, and an agitator. The temperature is kept below 50° C. during addition of butyraldehyde. After the addition is complete the mixture is slowly heated to 120° C. and kept at this temperature for one hour. The water formed is then allowed to separate as a lower layer and drawn off. The product is cooled to 30° C. and 80 lbs. carbon disulphide are added in a closed system using the usual precautions necessary in handling this material. The temperature is raised to 80° C. and held there for one and one-half (1½) hours. At the end of this time the reaction product is cooled to 50° C. and any unreacted volatile matter drawn off by the use of a high vacuum. The remaining oil is drawn off and collected in the usual manner. A product made in the above manner and tested in a pure gum mix in a percentage of 0.375 gave a good cure in thirty (30) minutes at twenty-five (25) lbs. steam pressure.

*Example 2.*—285 lbs. heptaldehyde and 180 lbs. butyraldehyde are added slowly to 92 lbs. of aniline. After the addition is complete the mixture is slowly heated to 140° C.

and held for one hour. The water formed is then allowed to separate as a lower layer and drawn off. The product is then cooled to 30° C. and 80 lbs. of carbon disulphide are added and the reaction completed as in Example (1). A product made in the above manner and tested in a pure gum mix in a percentage of 0.350 gave a good cure in thirty (30) minutes at twenty-five (25) lbs. steam pressure.

*Example 3.*—Nine hundred and thirty pounds of butyraldehyde are added to two hundred and fifty pounds of cooled 40% aqueous solution of methyl amine. This mixture is heated in a closed system to 110° C. for three hours. The water is drawn off or may be removed by a vacuum distillation. One hundred and thirty pounds of carbon disulphide are added and the reaction is completed as in Example (1). This product using 0.3 parts in a mix containing one hundred parts of pale crepe, 3 parts of sulphur and three parts of zinc oxide gave a good cure in an hour at twenty-five pounds steam pressure.

*Example 4.*—Two hundred and twenty-five pounds of benzaldehyde are slowly added to seventy-five pounds of normal butyl amine. The mixture is heated under pressure for two hours at 150° C. The water is removed by vacuum distillation and eighty pounds of carbon disulfide added. This product is heated to 100° C. under pressure for an hour, cooled and the uncombined carbon disulfide removed under high vacuum. The resulting product tested in a pure gum mix, three percent zinc oxide and three and a half percent sulfur gives a good cure in an hour at forty pounds steam pressure when three-quarters of one percent is used.

*Example 5.*—An example of the alternative method of manufacture of accelerator compounds by mixing the amine, carbon bisulfide and aldehyde all at once follows:

350 lbs. heptaldehyde are mixed with 80 lbs. of carbon bisulfide and to this mixture 110 lbs. of p-toluidine are added slowly. The mixture is then heated slowly to 140° C. and held for one hour.

The water formed is then allowed to separate and drawn off. Any unreacted volatile matter is then drawn off under vacuum. The product, made in the above manner, and tested in a pure gum mix in a percentage of 0.325 gave a good cure in 30 minutes at 25 lbs. steam pressure.

Products having similar accelerating activity to those prepared by treating the amine first with the aldehyde and then with $CS_2$, may be prepared in each instance by this alternative method.

As appears from applicant's prior Patent 1,732,532, of which this case is a continuation in part, other aldehydes than those specifically mentioned in the examples of this case, such as acetaldehyde, formaldehyde, m-butryaldehyde and propionaldehyde, are adapted to yield accelerators when combined in equimolecular proportions with primary amines and carbon disulphide. Likewise, as appears from the parent case, other primary amines such as methylamine, ethylamine, n-propylamine, iso-propylamine, iso-butylamine and o-toluidine, are adapted to yield accelerators when combined with the aldehydes and carbon disulphides.

While I have mentioned for purposes of illustration definite quantities of the reacting components and certain specific temperatures and times of reaction, and in general have given exact conditions under which my improved compounds may be made, I, of course, do not limit myself to these specific proportions or conditions. These illustrative conditions and methods of effecting the interaction and combination of the ingredients may obviously be varied without departing from my invention. In cases where I use more than one aldehyde I may use other aldehydes than those specified in Example (3), also more than one amine or a mixture of aromatic and aliphatic amines may be used. As little as one half a mole of carbon disulfide for each mole of amine may be employed.

The products of the invention are very high-boiling viscous liquids, dark in color and with a characteristic odor. An increase in the proportion of aldehyde employed increases their activity as accelerators. An increase in the proportion of carbon bisulfide, of course, results in an increase in the amount of combined sulfur and therefore also tends to increase accelerating activity. The proportion of the three reagents employed will therefore depend upon the properties desired in the accelerator. All of the products of the type disclosed in the examples, however, are effective accelerators for the vulcanization of rubber.

Although the products obtained as illustrated in the examples are of indefinite constitution, they contain in combination substantially all of the elements of the respective reagents with the exception of the water which is eliminated as shown in the equation given hereinabove. When aniline and carbon bisulfide are interacted, it is advisable to carry out the reaction at low temperatures or under pressure (as shown in the examples). As is well known, under these conditions hydrogen sulfide is not evolved or, at least, is not evolved in more than incidental amounts. The production of thiourea in substantial amounts, which would defeat the purposes of the invention, is thus avoided. When aldehyde and amine are first reacted and carbon bisulfide thereafter added, hydrogen sulfide is not evolved.

In the claims where I specify "a primary aromatic amine", I intend to cover, also, the substituted amines as aniline and its homologues such as the toluidines. Where I specify "rubber" I intend to cover all the botanical varieties of caoutchouc, which include hevea, balata, gutta percha, etc., and recognized substitutes therefor.

I claim:—

1. The process of treating rubber which comprises incorporating with the rubber, prior to vulcanization, the product obtained by the chemical combination in a closed vessel at a temperature above 100° C. of an aliphatic aldehyde containing a plurality of carbon atoms, a primary aromatic amine, and carbon bisulfide.

2. The process of treating rubber which comprises incorporating with the rubber, prior to vulcanization, the product obtained by the chemical combination under pressure sufficient to prevent liberation of hydrogen sulfide of an aliphatic aldehyde containing a plurality of carbon atoms, aniline, and carbon bisulfide.

3. The process of treating rubber which comprises incorporating with the rubber, prior to vulcanization, the product obtained by the chemical combination under pressure sufficient to prevent liberation of hydrogen sulfide of butyraldehyde, aniline, and carbon bisulfide, and thereafter vulcanizing.

4. The process of treating rubber which comprises incorporating with the rubber prior to vulcanization, the product obtained by the chemical combination, with the elimination only of water, of two or more moles of an aldehyde, one mole of a primary amine and carbondisulfide.

5. A process, such as covered by claim 4, in which more than 2½ moles of aldehyde are employed to one mole of amine.

6. The process of treating rubber which comprises incorporating with the rubber, prior to vulcanization, the product obtained by causing carbon bisulfide to react on the condensation product of a primary aromatic amine and an aliphatic aldehyde containing a plurality of carbon atoms.

7. The process of treating rubber which comprises incorporating with the rubber, prior to vulcanization, the product obtained by causing carbon bisulfide to react on the condensation product of aniline and an aliphatic aldehyde containing a plurality of carbon atoms, and thereafter vulcanizing.

8. The process of treating rubber which comprises incorporating with the rubber, prior to vulcanization, the product obtained by causing carbon bisulfide to react on the condensation product of a primary amine and an aldehyde containing a plurality of carbon atoms, the ratio of said aldehyde and amine forming said condensation product being such that two or more moles of aldehyde are employed to one mole of amine and thereafter vulcanizing.

9. A rubber composition obtainable by incorporating with rubber a vulcanizing agent and a compound formed by the interaction in a closed vessel at a temperature above 100° C. of a primary aromatic amine, an aldehyde and carbon disulphide and vulcanizing.

10. A rubber composition obtainable by incorporating with rubber a vulcanizing agent and a compound formed by the interaction under pressure sufficient to prevent liberation of hydrogen sulfide of a primary aromatic amine, an aliphatic aldehyde and carbon disulphide and vulcanizing.

11. A rubber composition obtainable by incorporating with rubber a vulcanizing agent and a compound formed by the interaction, with the elimination only of water, of substantially one mole of a primary amine, two or more moles of an aldehyde and carbon disulphide and vulcanizing.

12. A rubber composition obtainable by incorporating with rubber a vulcanizing agent and a compound formed by the interaction, with the elimination only of water, of substantially one mole of a primary amine, two to four moles of an aliphatic aldehyde and carbon disulphide and then vulcanizing.

13. A rubber composition obtainable by incorporating with rubber a vulcanizing agent and a compound formed by the interaction, with the elimination only of water, of substantially one mole of a primary aromatic amine, two to four moles of an aliphatic aldehyde and $CS_2$ and then vulcanizing.

14. A rubber composition obtainable by incorporating with the rubber, prior to vulcanization, the product obtained by causing carbon bisulfide to react on the condensation product of a primary aromatic amine and an aliphatic aldehyde containing a plurality of carbon atoms and vulcanizing.

15. A rubber composition obtainable by incorporating with the rubber, prior to vulcanization, the product obtained by causing carbon bisulfide to react on the condensation product of aniline and butyraldehyde.

16. A rubber composition obtainable by incorporating with the rubber, prior to vulcanization, the product obtainable by causing carbonbisulfide to react on the condensation product of 1 mole of a primary amine and 2 or more moles of an aldehyde containing a plurality of carbon atoms and then vulcanizing.

17. A rubber composition obtainable by incorporating with the rubber prior to vulcanization the product obtained by causing 80 lbs. of carbon bisulfide to react on the condensation product of 310 lbs. of butyraldehyde and 100 lbs. of aniline.

18. The process of treating rubber which comprises incorporating with the rubber, prior to vulcanization, a product obtained by combining, with the elimination of water only, of $CS_2$, and saturated straight chain aliphatic aldehyde containing 2 to 7 carbon atoms and a primary amine of the class consisting of methyl and butyl amines, aniline and an amino methyl benzene, 2 to 4 moles of aldehyde being employed per mole of amine.

19. The process of claim 18 wherein the amine is an aliphatic amine and is combined with at least ½ mole of $CS_2$ and from 2 to 4 moles of aldehyde.

20. The process of treating rubber which comprises incorporating with the rubber, prior to vulcanization, a product obtained by combining, with the elimination of water only, of $CS_2$, a saturated straight chain aliphatic aldehyde containing from 2 to 7 carbon atoms and a primary aromatic amine of the class consisting of aniline and the amino methyl benzenes.

21. The process of claim 20 wherein the amine is aniline.

In testimony whereof I affix my signature.

DONALD H. POWERS.